US007646431B2

(12) United States Patent
Lee

(10) Patent No.: US 7,646,431 B2
(45) Date of Patent: Jan. 12, 2010

(54) AUXILIARY SIGNAL SYNCHRONIZATION FOR CLOSED CAPTIONING INSERTION

(75) Inventor: Janghwan Lee, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 405 days.

(21) Appl. No.: 10/512,366

(22) PCT Filed: Apr. 21, 2003

(86) PCT No.: PCT/US03/12174

§ 371 (c)(1), (2), (4) Date: Oct. 25, 2004

(87) PCT Pub. No.: WO03/092274

PCT Pub. Date: Nov. 6, 2003

(65) Prior Publication Data

US 2005/0177856 A1 Aug. 11, 2005

Related U.S. Application Data

(60) Provisional application No. 60/375,194, filed on Apr. 24, 2002.

(51) Int. Cl.
*H04N 7/00* (2006.01)
*H04N 11/00* (2006.01)
(52) U.S. Cl. .................. 348/465; 348/468; 348/564; 348/565
(58) Field of Classification Search .......... 348/465, 348/468, 568, 564, 565, 563, 554–555, 725; 725/40–43, 100; *H04N 7/00, 11/00*
See application file for complete search history.

(56) References Cited

U.S. PATENT DOCUMENTS 4,724,487 A 2/1988 Casey
5,109,279 A * 4/1992 Ando ..................... 348/564

(Continued)

OTHER PUBLICATIONS

Search Report Dated June 24, 2003.

*Primary Examiner*—Trang U Tran
(74) *Attorney, Agent, or Firm*—Robert D. Shedd; Joseph J. Opalach; Brian J. Cromarty

(57) ABSTRACT

A system, apparatus and/or method included in or embodied as a television signal receiver synchronizes auxiliary data with an auxiliary video output signal for appropriately inserting closed captioning into the auxiliary video signal. In one form, the television signal receiver correlates a main video signal with the auxiliary video signal in order to ascertain when and/or where to insert the auxiliary data in to the auxiliary video signal. In an exemplary manner, the field information between a video portion of a main television signal and a video portion of an auxiliary output television signal is tracked for determining field inversion between the two. Through the determination of field inversion between the video portion of the main television signal and the video portion of the auxiliary output television signal, auxiliary data such as closed caption, extended data service and the like, is provided to (inserted in) an auxiliary television signal output in a sequence proper for the sequence of video data being provided thereto. Proper sequencing of the auxiliary data allows the auxiliary data to be provided appropriately with the auxiliary video portion of the television signal to the auxiliary television signal output. Additionally, the system, method and/or apparatus provides a field delay if a deinterlacer is used (i.e. to produce a signal suitable for progressive scan images).

18 Claims, 5 Drawing Sheets

U.S. PATENT DOCUMENTS

| | | | |
|---|---|---|---|
| 5,121,205 A * | 6/1992 | Ng et al. | 348/568 |
| 5,369,444 A | 11/1994 | Ersoz et al. | |
| 5,512,954 A * | 4/1996 | Shintani | 348/468 |
| 5,790,204 A * | 8/1998 | Yamaguchi | 348/564 |
| 6,388,700 B1 * | 5/2002 | Beyers et al. | 348/571 |
| 7,143,328 B1 * | 11/2006 | Altmann | 714/746 |

* cited by examiner

AUXILIARY SIGNAL SYNCHRONIZATION FOR CLOSED CAPTIONING INSERTION

This application claims the benefit, under 35 U.S.C. § 365 of International Application PCT/US03/12174, filed Apr. 21, 2003, which was published in accordance with PCT Article 21(2) on Nov. 6, 2003 in English and which claims the benefit of U.S. Provisional Patent Application No. 60/375,194, filed Apr. 24, 2002.

BACKGROUND

1. Field of the Invention

The present invention concerns television signal processing and, more particularly, concerns a system, method and/or apparatus that is operative to correlate auxiliary information of a television signal to an auxiliary video output signal.

2. Background Information

Current televisions typically include an auxiliary output that allows a user to connect a device thereto that utilizes the television signals received by the television. The device thus utilizes the audio and video signals of the television signal. As is known in the art, in addition to the normal audio and video information or data contained in a television signal, a television signal may also contain what is known as auxiliary information or data. Such auxiliary information typically includes, but is not limited to, teletext data, closed caption data, extended data service (XDS) data, and the like. Heretofore, the auxiliary data has either not been provided to the auxiliary output with the audio and video data or has only been sporadically provided to the auxiliary output with the audio and video data.

Moreover, as is known in the art, the video portion of a television signal is provided in fields of information, with two fields constituting a frame. In what is known as an interfaced format, the first field is provided to a display and then the second field is provided to the display that is interlaced into the first field. In what is known as a progressive mode, the two fields are provided simultaneously (i.e. line by line) to a display. According to convention, the auxiliary data is provided in particular lines of the first and second fields.

In one form, auxiliary data includes or constitutes what is known as closed caption data. Closed caption data provides text for the audio portion of the television signal that is displayable on a display for the aid of hearing impaired individuals. Because this information is sequential in nature, it is essential that the closed caption data from the first field be presented before the closed caption data from the second field. Otherwise, if the data is not provided in the correct order, the displayed text will be out of order, be nonsensical, and thus defeat the purpose of aiding the hearing impaired.

When closed caption data is output to an auxiliary output using a vertical interrupt of the main display, there could be a difference between the auxiliary and main field information. Sometimes, then field inversion can exist between the main output and the auxiliary output, causing the problem that first field data may be output to the second field and vice versa. For the video portion of the television signal, this may not be a problem. However, for auxiliary information such as closed caption data or extended data service (XDS) data, if the field is changed, i.e. the auxiliary information is in an incorrect field, correct extraction of the closed caption and XDS data cannot occur.

It is thus evident from the above that there is a need for correctly inserting auxiliary information (e.g. closed caption and/or XDS data) from a received television signal into an auxiliary video signal in a television signal receiver.

It is thus further evident from the above that there is a need for synchronizing auxiliary data with an auxiliary video output signal in a television signal receiver.

SUMMARY OF THE INVENTION

A system, apparatus and/or method embodied as or in a television signal receiver, synchronizes auxiliary data of a television signal with an auxiliary video signal derived from the television signal and provided to an auxiliary output of the television signal receiver, in order to allow proper display of the auxiliary data with the auxiliary video signal.

In one form, there is provided a method of inserting auxiliary data into an auxiliary video signal in a television signal receiver. The method includes the steps of: (a) receiving a television signal having a video component and an auxiliary data component; (b) processing the television signal to obtain a main video signal and an auxiliary video signal from the video component; (c) processing the television signal to extract auxiliary data from the auxiliary data component; (d) synchronizing the extracted auxiliary data with the auxiliary video signal utilizing the main video signal; and (e) outputting the synchronized auxiliary data with the auxiliary video signal to an auxiliary output of the television signal receiver.

BRIEF DESCRIPTION OF THE DRAWINGS

In the drawings.

Corresponding reference characters indicate corresponding parts throughout the several views.

DESCRIPTION OF THE PREFERRED EMBODIMENT(S)

A system, apparatus and/or method embodied as or in a television signal receiver according to the principles of the subject invention, synchronizes auxiliary data of a television signal with an auxiliary video signal derived from the television signal and provided to an auxiliary output of the television signal receiver, in order to allow proper display of the auxiliary data with the auxiliary video signal. According to one aspect of the subject invention, the television signal receiver tracks field information between a video portion of a main television signal (i.e. a main video signal) and a video portion of an auxiliary output television signal (i.e. an auxiliary video signal) for determining field inversion between the two video signals. Through the determination of field inversion between the main video signal and the auxiliary video signal for the auxiliary output television signal, auxiliary data such as closed caption, extended data service and the like, is provided to an auxiliary television signal output in a sequence proper for the sequence of video data being provided thereto. Proper sequencing of the auxiliary data allows the auxiliary data to be provided appropriately with the auxiliary video portion of the television signal to the auxiliary television signal output. Additionally, the system, method and/or apparatus provides a field delay if a deinterlacer is used (i.e. to produce a signal suitable for progressive scan images).

Figure 1:
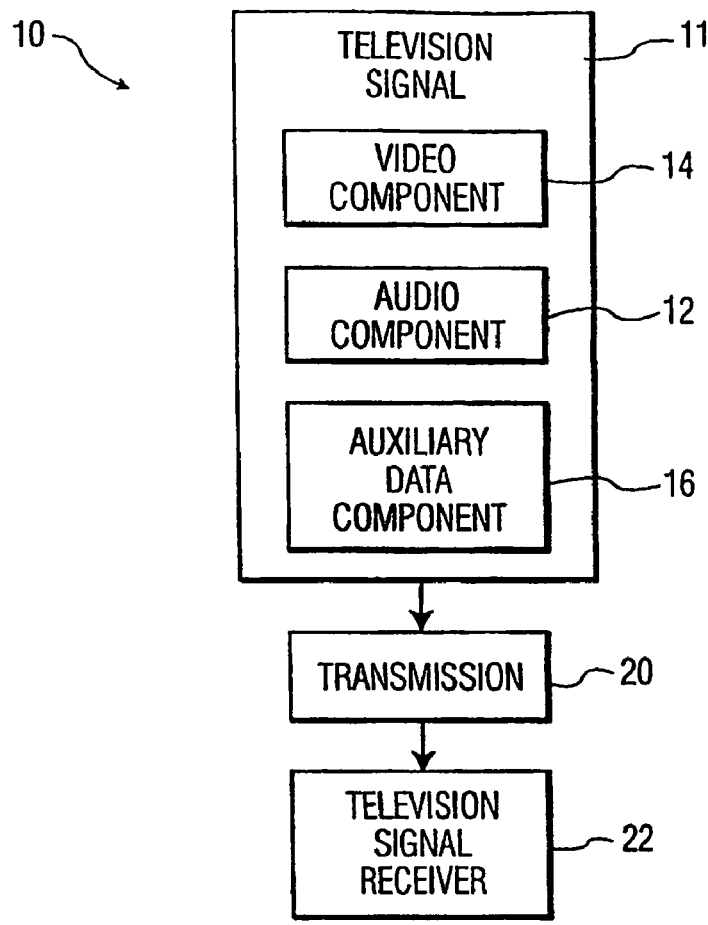
FIG. 1 is a block diagram representation of a television system incorporating a television signal receiver in accordance with the principles of the subject invention.

Referring now to FIG. 1, there is depicted a block diagram of a television signal system generally designated 10. The television signal system 10 provides a television signal generally designated 11. The television signal 11 is representative of an analog television signal and/or a digital television signal. Moreover, the television signal 11 represents at least one if not more television channels each television channel or signal carrying a program or programming. In the below discussion, the television signal 11 will be assumed to be a single television channel, although as in the case of a digital television signal, multiple television channels may be carried thereby.

The television signal 11 has an audio component 12. The audio component carries audio information or data for the television channel or program thereof for the reproduction of the audio. The form of the audio component 12, according to one aspect thereof, is consistent with whether the television signal 11 is an analog television signal or a digital television signal. According to another aspect thereof, the audio component 12 may be provided in any scheme, format or the like, such as is known in the art.

The television signal 11 also has a video component 14. The video component carries video information or data for the television channel or program thereof for the reproduction of the video. The form of the video component 14, according to one aspect thereof, is consistent with whether the television signal 11 is an analog television signal or a digital television signal. According to another aspect thereof, the video component 14 may be provided in any scheme, format or the like, such as is known in the art.

The television signal 11 further has an auxiliary data or information component 16. The auxiliary data component 16 carries auxiliary data that may or may not pertain to the television channel or program. The form of the auxiliary data, according to one aspect thereof, is consistent with whether the television signal 11 is an analog television signal or a digital television signal. In the case of an analog television signal, the auxiliary data may comprise data carried in the vertical blanking interval (VBI) such as is known in the art. This information includes, but is not limited to, closed caption data, teletext data, V-chip data (i.e. parental control or rating data for the particular television program being carried by the television signal), extended data service (XDS) data, test data, and/or other information. In the case of a digital television signal, the auxiliary data is provided as PSIP (Program and System Information Protocol) information or data. In addition to the same type of information contained in the VBI of an analog television signal, the PSIP information also includes what is known as an off-air guide. The off-air guide includes virtual channel number, program title and other information that are used to display various information regarding a given program and channel. The PSIP data also includes (within the off-air guide or not) rating information for parental control. Regardless of the form thereof, the auxiliary data may provide other information and/or data not specifically mentioned herein.

Figure 2:
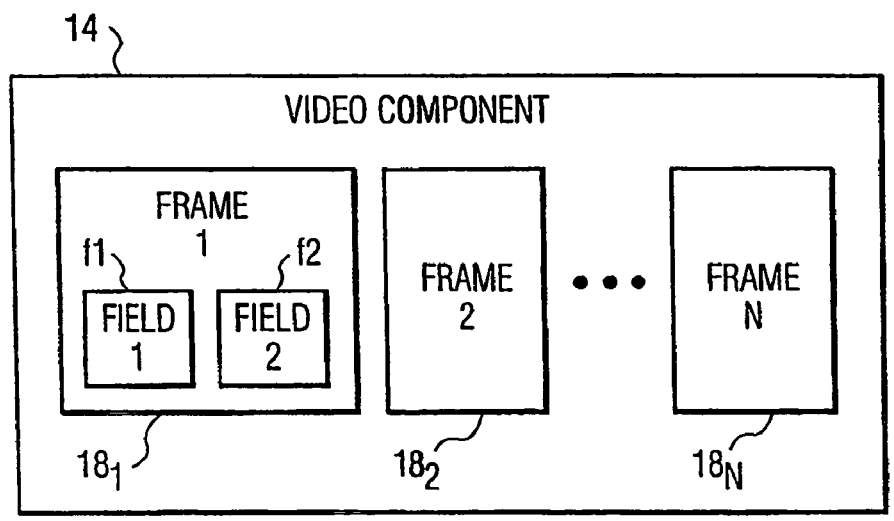
FIG. 2 is a representation of the video component of a television signal.

Referring additionally to FIG. 2, a representation of the video component 14 of the television signal 11 is illustrated. The video component 14 includes a plurality of frames represented by frames $18_1$, $18_2$ through $18_N$, but which may be generally designated 18. The plurality of frames 18 constitutes the video portion of a program which, when properly assembled and/or sequenced, is displayable on a display. Each frame 18 comprises two fields f1 and f2 each having a plurality of lines of information. While only one frame $18_1$ is shown with the two fields f1 and f2, it should be appreciated that each frame 18 has the two fields. Depending on the type of television signal and/or the type of television signal receiver, the frames and/or fields are processed accordingly. The lines of information of each field contain video data, television control data, the auxiliary data (with respect to an analog television signal), and other data such as is known in the art.

Referring back to the system 10 of FIG. 1, the television signal 11 is then transmitted, as represented by the transmission box 20, to a television signal receiver (TSR) 22. Transmission 20 includes transmission over the air, via satellite, cable system and/or the like. Transmission 20 also includes re-transmission, including any manner in which the television signal 11 is distributed to the television signal receiver 22. The television signal receiver 22 is typically a television such as is commonly known in the art, but may include a set-top box (e.g. a cable box or a satellite box), or other component that is operative, adapted and/or configured to receive and process television signals.

Figure 3:
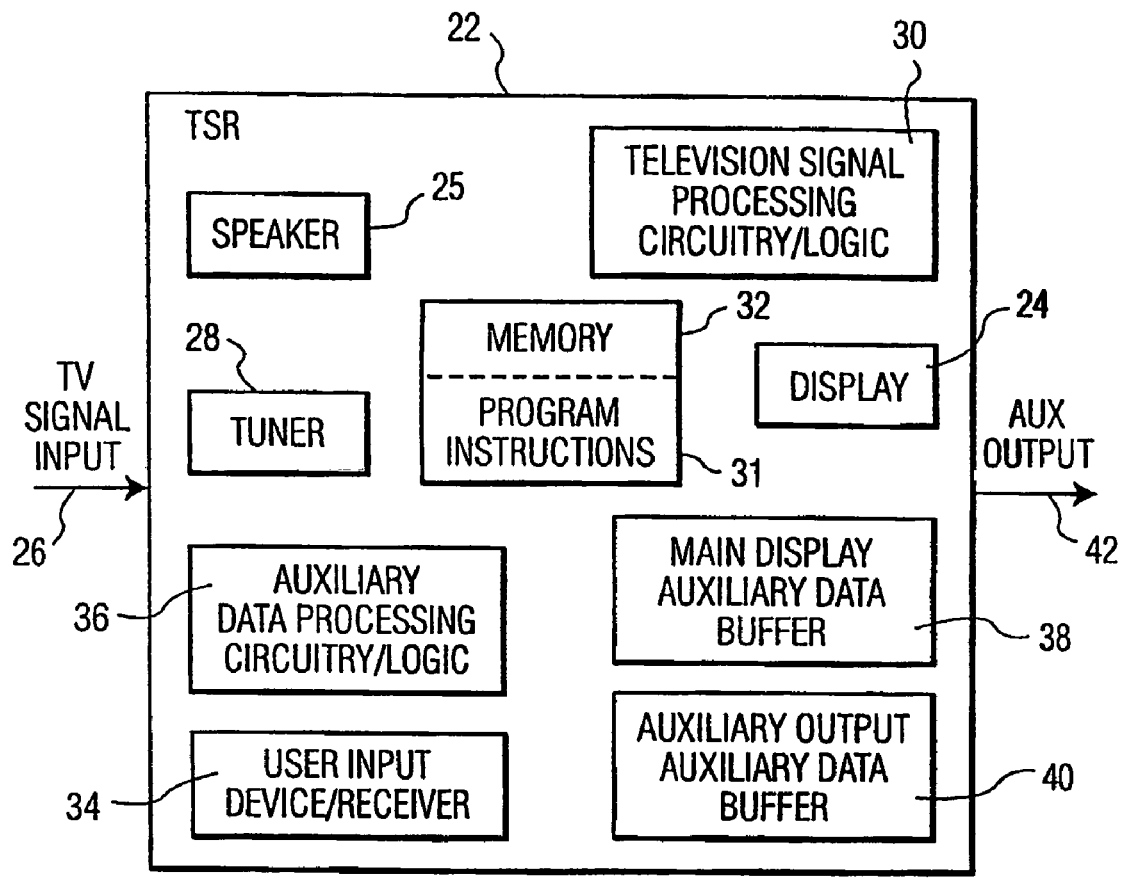
FIG. 3 is a block diagram of an exemplary television signal receiver in accordance with the principles of the subject invention.

In FIG. 3, there is depicted a block diagram of an exemplary television signal receiver 22 in accordance with the principles of the subject invention. Particularly, the television signal receiver 22 is operative to receive the television signal 11 and process the television signal as provided herein. It should initially be appreciated that the television signal receiver 22 may or may not include an integral display 24. In the case that the television signal receiver 22 does not include an integral display 24, the television signal receiver 22 is connectable to a display 24. In both cases the display 24 is adapted, configured and/or operative to display video as provided in a received television signal, processed by the television signal receiver 22, and outputted as a main video signal. The television signal receiver 22 may therefore be embodied as various types of television signal processing systems, such as a television (having an integral display), a set-top box (connectable to a display), satellite receiver (connectable to a display), or the like such as is known in the art. Further, the television signal receiver 22 may or may not have an integral speaker 25 that is adapted to reproduce the audio component 12 of the television signal 11.

The television signal receiver 22 has an input 26 that is adapted, configured and/or operative to be connected to and thus receive the television signal 11 and preferably a plurality of television signals (e.g. digital television (DTV) transport streams (TS) or signals and/or analog television channels/signals). A tuner 28 is provided that is adapted, configured and/or operative to receive and tune a particular television channel. The tuner 28 is operative, configured and/or adapted to tune either digital and/or analog television signals as the case may be. The tuner 28 may thus represent two tuners, one for digital television signals and the other for analog television signals. Of course, other configurations may be used and are contemplated.

The television signal receiver 22 further includes television signal processing circuitry/logic, processor, processing means, or the like 30. While the television processing circuitry/logic is depicted as a single block or component, it should be appreciated that the television processing circuitry/logic 30 may be embodied as one or more integrated circuits (ICs) with or without additional circuitry/logic. The television processing circuitry/logic 30 is adapted, configured and/or operative to process analog and/or digital television signals, as the case may be, in order to obtain the audio component 12 for sound reproduction, the video component 14 for display, and separate out the auxiliary information component 16. The television processing circuitry/logic 30 is further adapted, configured and/or operative to perform the functionality as described herein in accordance with the present principles, and other television signal receiver tasks such as are typical and/or known in the art and to generally control, regulate and/or operate the components of the television signal receiver 22. To this end, the television processing circuitry/logic 30 is adapted, configured and/or operative to utilize programming (software), program instructions 31 and/or the like that are stored in a memory 32. The program instructions 31 may be written in any language that is, of course, compatible with the television signal receiver 22. The memory 32 may be RAM, ROM, or the like, and/or a combination of various types of memory as is appropriate. As such, the memory 32 is operative to store more than just program instructions, such as television operating preferences, channel lists, user programmed station identifiers, and the like.

In accordance with the principles of the subject invention, the television signal processing circuitry/logic 30 is operative to provide the processed video component of the television signal to the display 24 as a main video signal. The television signal processing circuitry/logic 30 is also operative to provide the processed video component of the television signal to an auxiliary output 42 as an auxiliary video signal.

Moreover, the television signal receiver 22 includes a user input device and/or receiver 34. The user input device/receiver 34 is adapted, configured and/or operable to accept or receive input from a user regarding an aspect, feature and/or preference with regard to the television signal receiver 22. In one form, the user input device/receiver 34 may be a remote control (not shown) and associated remote control receiver such as an IR transmitter/receiver. In another form, the user input device/receiver 34 may be a panel of buttons or the like that allow user input. User input is accepted by the television signal receiver 22 for various purposes such as in response to function and/or feature choices provided as on-screen menu choices and/or options.

Still further, the television signal receiver 22 includes auxiliary data processing circuitry/logic 36 that is operative, adapted and/or configured to receive the auxiliary data component 16 as separated out of or extracted from the television signal 11 by the television signal processing circuitry/logic 30, or as separated out of or extracted from the auxiliary data component 16 of the television signal 11 by the auxiliary data processing circuitry/logic 36, and process the auxiliary data as appropriate for the type of content thereof. In one form, the auxiliary data processing circuitry/logic 36 is particularly operative to extract closed caption data. It should be understood, however, that the auxiliary data processing circuitry/logic 36 is preferably operative to extract other auxiliary data such as XDS, teletext, and the like. While the present invention will hereinafter be described in connection with closed caption data, it should be understood that the present invention applies equally to other types of auxiliary data.

The auxiliary data processing circuitry/logic 36 provides the extracted closed caption data to a main display auxiliary data buffer 38. The main display auxiliary data buffer 38 is operative, adapted and/or configured to temporarily store the closed caption data and provide same to the display 24 at the proper time and in the proper sequence. The main display auxiliary data buffer 38 utilizes a vertical interrupt from the main video component for appropriately providing the closed caption data to the display 24 along with the main video signal.

The auxiliary data processing circuitry/logic 36 also provides the extracted closed caption data to an auxiliary output auxiliary data buffer 40. The auxiliary output auxiliary data buffer 40 is operative, adapted and/or configured to temporarily store the closed caption data and provide same to the auxiliary output 42 at the proper time and in the proper sequence. The auxiliary output auxiliary data buffer 40 utilizes a vertical interrupt from the main video component for appropriately providing the closed caption data to the auxiliary output 42 along with the auxiliary video signal.

It should be appreciated that the television signal receiver 22 also includes other components not particularly shown and/or described herein that are typical of digital television signal receivers. Moreover, the television signal receiver 22 is capable of many features and/or functions typical of current television signal receivers.

The television signal receiver 22 stores the program instructions 31 in the memory 32 which are executable by the processing circuitry/logic 30 for operation of the television signal receiver 22 and/or by the other components for the operation thereof. In accordance with the principles of the subject invention, the program instructions 31 provide for synchronization of the auxiliary data to the auxiliary video output signal. This is accomplished by correlating the auxiliary video signal with the main video signal. In one exemplary form, this is accomplished using a main video interrupt signal, (e.g. the VBI). Particularly, this may be accomplished in one exemplary manner through the detection of field inversion between the main video signal and the auxiliary video signal. More particularly, in one exemplary manner, the subject invention sends the extracted closed caption data to the auxiliary output 42 using a vertical interrupt signal of the main video signal that is preferably derived from or is the vertical sync or vertical blanking interval signal therefrom. Sometimes, the main and auxiliary display field may not be the same because the clock frequency may differ between the main and auxiliary signals. For example, the main display (main video signal) may have a frequency comprising one of 60 Hz, 59.94 Hz, 30 Hz, and 29.97 Hz. For the main video signal this is 60 Hz or 59.94 Hz for a progressive mode, and 30 Hz or 29.97 Hz for an interlaced mode. However, the auxiliary video signal is most likely to be in an interlaced mode of 29.97 Hz. Thus, the program instructions 31 provide for checking or detecting whether field inversion exists between the main video signal (for the display 24) and the auxiliary video signal (for the auxiliary output 42). This appropriately provides the synchronization of the auxiliary data with the auxiliary video signal for appropriately providing the closed captioning to the auxiliary video signal output.

Particularly, the television signal receiver 22 detects or determines whether field inversion exists between the main video signal and the auxiliary video signal during an interrupt routine. Since the closed caption data occurs in between the fields, the interrupt routine utilizes a vertical sync or vertical blanking signal of the main video signal as an interrupt that begins the routine. Further, the television signal receiver 22 appropriately provides the closed caption data to the auxiliary output 42 based on the interrupt routine. In one form, the television signal receiver utilizes an interrupt routine for checking the phase of the auxiliary display signal is (video signal) with respect to the main display signal (main video signal) using a main display interrupt. This routine is typically accomplished after a channel tune (channel change) has been initiated or a closed caption "ON" has been recognized by the television signal receiver 22. In another form, the routine may be accomplished every time the vertical interrupt is encountered.

Figure 4:
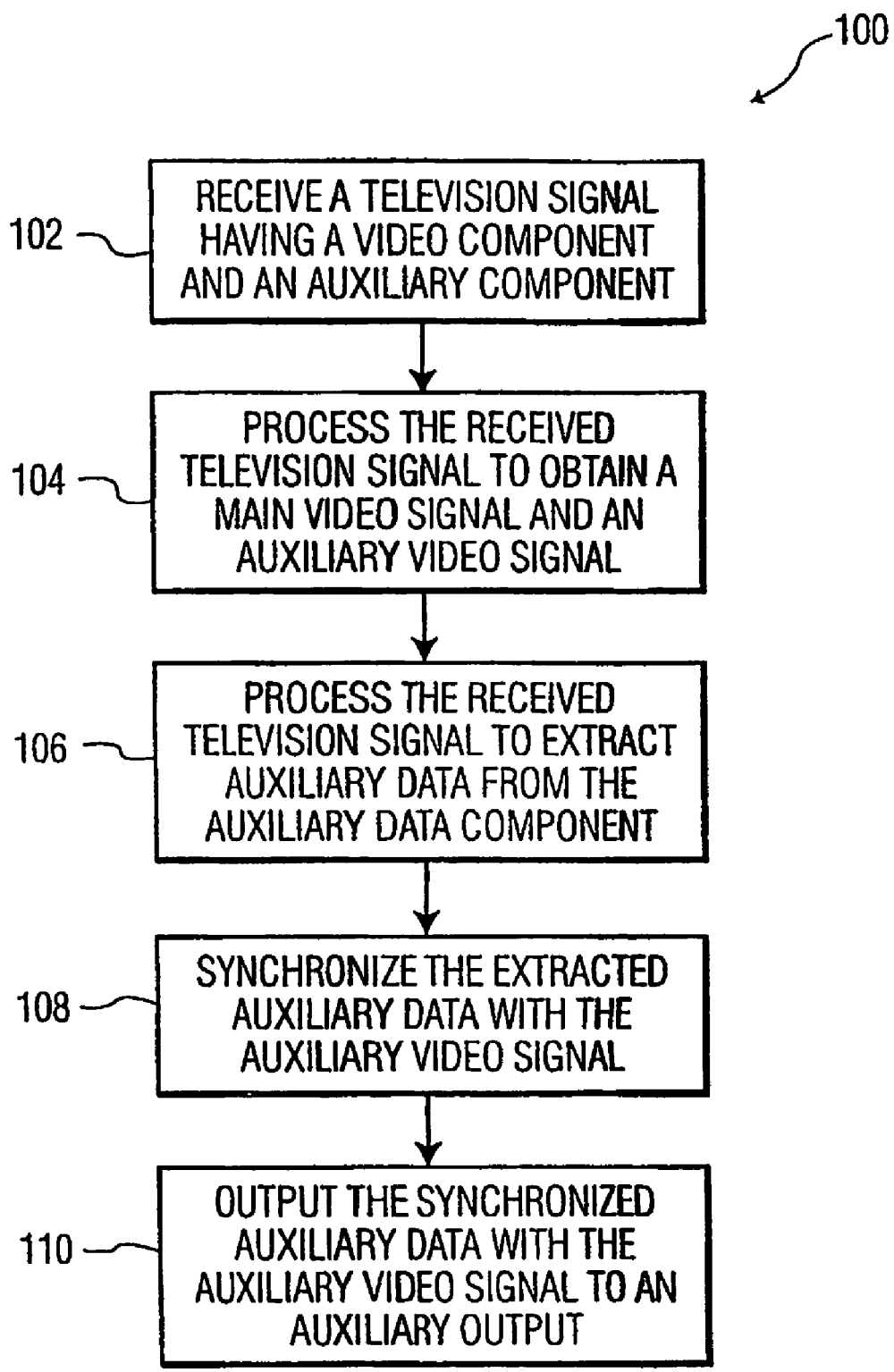
FIG. 4 is a flowchart of an exemplary manner of synchronizing auxiliary data with an auxiliary video signal in a television signal receiver in accordance with the principles of the subject invention.

Referring now to FIG. 4, there is depicted a flowchart, generally designated 100, for generally synchronizing auxiliary data from a television signal with an auxiliary video signal in a television signal receiver in accordance with the principles of the subject invention. In block 102, the television signal receiver 22 receives a television signal 11. The television signal 11 includes a video component 14 and an auxiliary data component 16. The television signal receiver 22 thereafter, in block 104, processes the received television signal (i.e. the video component thereof) to obtain a main video signal and an auxiliary video signal. The main video signal is to be provided to the display 24 of the television signal receiver in either a progressive mode or an interlace mode, and in one of the above-mentioned frequencies. The auxiliary video signal is typically, but not necessarily, to be provided to the auxiliary output of the television signal receiver 22, typically in an interlaced mode according to one of the two frequencies mentioned above.

The television signal receiver, in block 106, processes the received television signal (i.e. the auxiliary data component) to obtain or extract auxiliary data (e.g. closed caption). The closed caption data will be provided to the main video signal for possible display therewith, and particularly with the auxiliary video signal for possible display therewith. In block 108, the television signal receiver 22 then synchronizes the extracted auxiliary data with the auxiliary video signal in order to ensure that the auxiliary data will be displayable with the auxiliary video signal and/or in a proper sequence therewith. Thereafter, in block 110, the television signal receiver 22 provides the auxiliary data synchronized with the auxiliary video signal to the auxiliary output thereof.

It should be appreciated that the routine or method described in connection with the flowchart 100 of FIG. 4, is only exemplary of a manner of inserting and/or synchronizing auxiliary data with an auxiliary video signal. Other routines, methods, and/or versions thereof are possible and contemplated.

Figure 5:
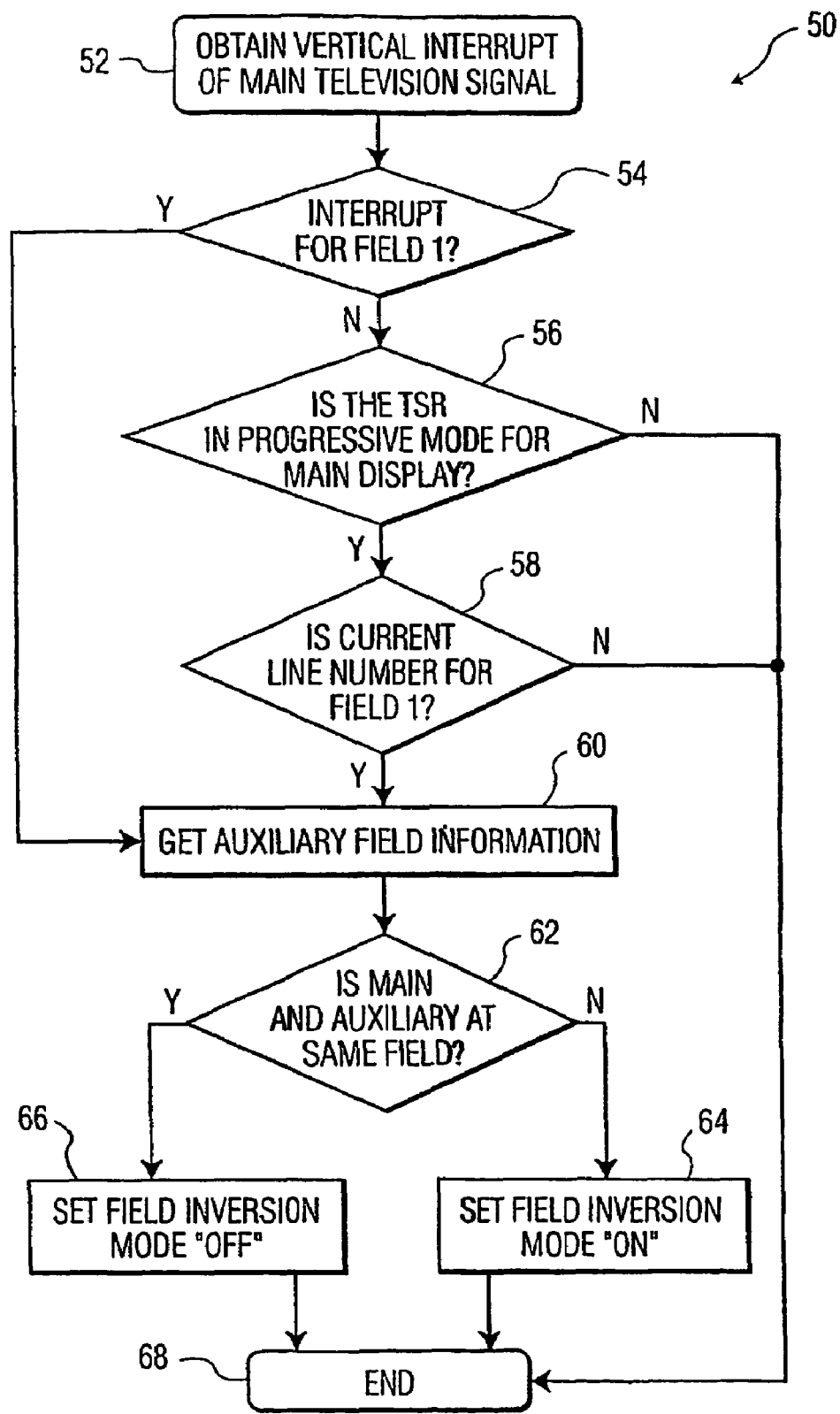
FIG. 5 is a flowchart of an exemplary manner of detecting field inversion, particularly an interrupt routine for checking the phase of the auxiliary display signal with respect to the main display signal using the main display interrupt according to one aspect of the subject invention, particularly to synchronize the auxiliary video output signal with respect to the main video signal in order to appropriately insert auxiliary information into the auxiliary video output signal.

Referring now to FIG. 5, there is depicted a flowchart, generally designated 50 for determining or detecting whether field inversion has occurred between the auxiliary video signal being outputted to the auxiliary output 42 of the television signal receiver 22 and the main video signal of the television signal receiver 22 in accordance with an aspect of the subject invention, particularly in order to synchronize the auxiliary data with the auxiliary video signal. In block or step 52 a vertical interrupt of the main video signal is obtained. In block 54, the television signal receiver 22 determines whether the interrupt is for field 1. If the interrupt is for field 1 (represented by "Y" for yes), the routine 50 then skips to block 60. Because field 1 is always presented before field 2, field 1 is a beginning point since the closed caption data will also begin at field 1. In block 60, the routine 50 gets field information from the auxiliary video signal. Thereafter, in block 62, the routine 50 utilizes the auxiliary field information obtained in block 60 to determine whether the main video signal and the auxiliary video signal are at the same field. The main video signal has already been determined to be at field 1 in block 54. If the main video signal and the auxiliary video signal are determined to be at the same field (represented by "Y" for yes), then the routine goes to block 66. Block 66 sets or maintain a field inversion mode of the television signal receiver with respect to the auxiliary video signal to "OFF". Thereafter, the routine proceeds to block 68, where the routine ends. If, in block 62, it is determined that the main video signal and the auxiliary video signal are not at the same field (represented by "N" for no), the routine proceeds to block 64. In block 64, the routine sets or maintains the field inversion mode of the television signal receiver with respect to the auxiliary video signal to "ON". Thereafter, the routine proceeds to block 68, where the routine ends.

In block 54, if it is determined that the interrupt obtained in block 52 is not for field 1 (represented by "N" for no), the routine proceeds to block 56. In block 56 the routine determines whether the television signal receiver 22 (TSR) is in a progressive mode with respect to the main video signal. If it is determined in block 56 that the television signal receiver 22 is not in the progressive mode (represented by "N" for no, indicating that the television signal receiver is in an interlace mode), the routine proceeds to block 68 where the routine ends. If, in block 56, it is determined that the television signal receiver is in a progressive mode (represented by "Y" for yes), the routine proceeds to block 58.

In block 58, the routine determines whether the current line number for the main video signal is for field 1. If it is determined that the current line number is not for field 1 (represented by "N" for no), the routine proceeds to block 68 and ends. If it is determined that the current line number is for field 1 (represented by "Y" for yes), the routine proceeds to block 60. Block 60 and its following steps are discussed above.

It can be understood from the flowchart 50 of FIG. 5, how the television signal receiver 22, in one exemplary manner, detects whether the auxiliary video signal is at the same field as the main video signal for providing the closed captioning. In this routine, the line number interrupt (such as at line number 4-5) can be provided as a vertical interrupt so it is possible to obtain the field 1 interrupt through this vertical interrupt even if the main display signal (main video signal) generating device is in the progressive mode rather than an interlace mode. Thus, that is the reason why the routine needs to check the current line number. For detecting whether the main and auxiliary are at the same field or not. It may also be desirable to control delay (e.g. add some hysteresis) for preventing a 1-2 temporal field inversion.

Figure 6:
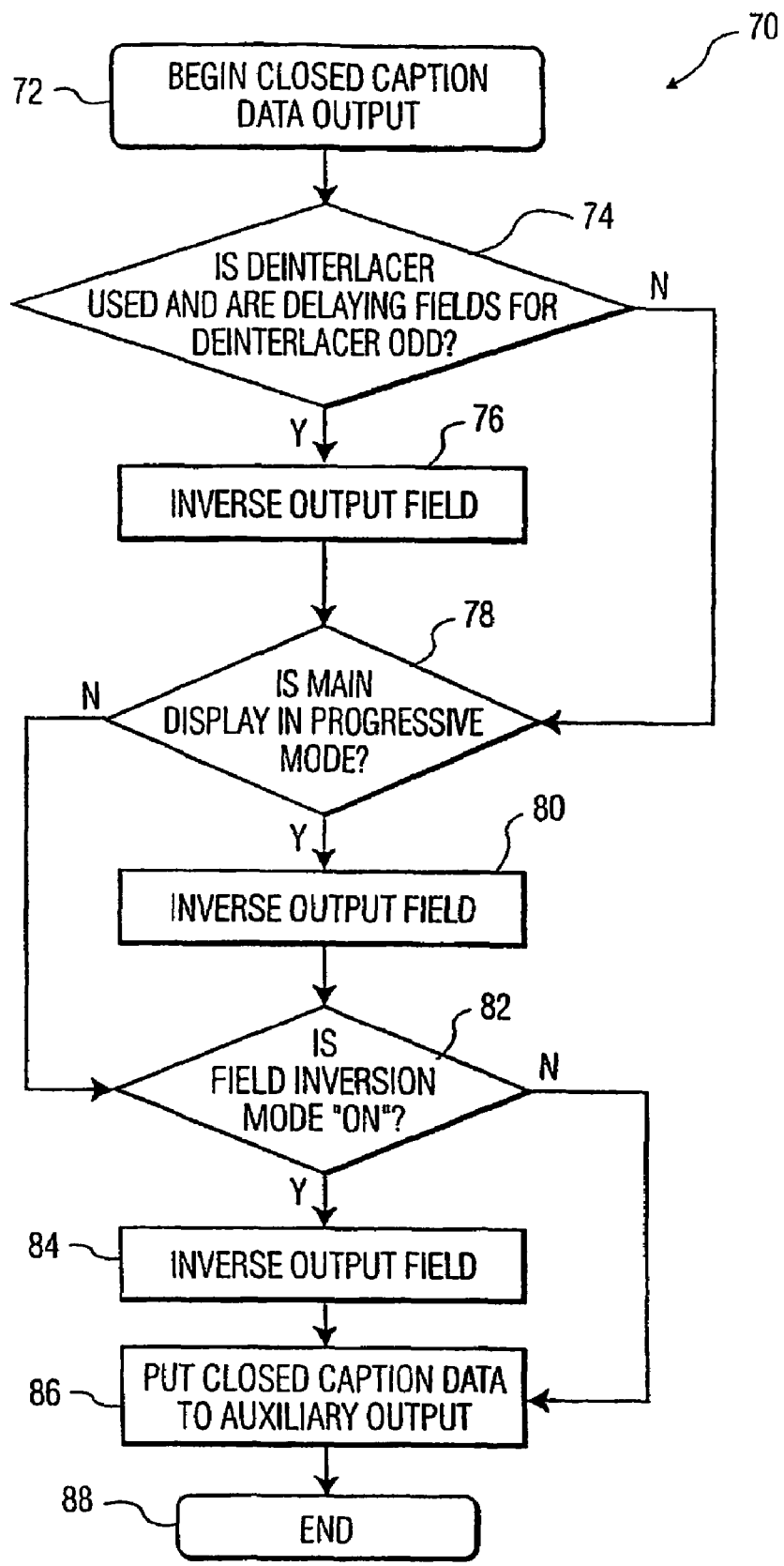
FIG. 6 is a flowchart of an exemplary manner of outputting closed caption data (i.e. auxiliary information/data) with respect to the correct field in accordance with another aspect of the subject invention, particularly in order to insert the closed caption data into the auxiliary video output signal.

Referring now to FIG. 6, there is depicted a flowchart, generally designated 70 of a routine for putting the closed caption data to the auxiliary buffer 40 for next fields in order to synchronize the extracted closed caption data with the auxiliary video signal. In block 72, the routine for providing closed caption data out begins. Thereafter, in block 74 the television signal receiver determines whether deinterlacing is being used and, if so, whether the fields are odd. If it is determined that deinterlacing is not used (represented by "N" for no), the routine proceeds to block 78. If it is determined that deinterlacing is used and the fields are odd (represented by "Y" for yes), the routine proceeds to block 76. In block 76 the output field is inversed. Thereafter, the routine proceeds to block 78.

In block 78, the routine determines whether the main display is in a progressive mode. If the main display is determined to be in the progressive mode (represented by "Y" for yes), the routine proceeds to block 80 and the output field is inversed. The routine then proceeds to block 82. In block 78, if the main display is determined to not be in the progressive mode (represented by "N" for no), the routine proceeds to block 82.

In block 82, the television signal receiver determines whether the field inversion mode is "ON" (as set by the routine 50 of FIG. 4). If the field inversion mode is "ON" (represented by "Y" for yes), the routine proceeds to block 84. In block 84, the television signal receiver inverses the output field. Thereafter, the routine proceeds to block 86. If television signal receiver 22 determines in block 82 that the field inversion mode is not "ON" (represented by "N" for no), the routine proceeds to block 86. At block 86, the routine then puts the closed caption data to the auxiliary output. Thereafter, the routine ends in block 88.

It can be understood from the flowchart 70 of FIG. 6, how the television signal receiver 22, in one exemplary manner, may place closed caption data at the correct field. For a system including a deinterlacer, it is necessary to invert the field information once because the system will cause a one field delay if the deinterlacer is working. For a progressive mode on the main video signal, it is necessary to invert the field information once, because there will be a one field delay for this case. Also, it is possible to use the field inversion information that comes from the routine 50 of FIG. 5. Therefore, a system as described herein makes it possible to put the closed caption data at the correct field if the cases identified herein are checked as described above.

It should be appreciated that a method in accordance with the principles of the subject invention may contain more steps than described in conjunction with the flowcharts 100, 50 and 70 of FIGS. 4, 5 and 6 and/or different or modified steps than that described. As well, other manners of detecting or determining field inversion and appropriately providing closed caption (auxiliary data) to the auxiliary output are contemplated and expected.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

What is claimed is:

1. In a television signal processing system, a method of inserting auxiliary data into an auxiliary video output signal comprising:
    receiving a television signal having a video component and an auxiliary data component;
    processing the television signal to obtain a main video signal and an auxiliary video signal from the video component;
    processing the television signal to extract auxiliary data from the auxiliary data component;
    detecting a field inversion between said main video signal and said auxiliary video signal;
    synchronizing the extracted auxiliary data with the auxiliary video signal in response to said detection of said field inversion; and
    outputting the synchronized extracted auxiliary data with the auxiliary video signal to an auxiliary output of the television signal processing system while outputting said main video signal to a primary output or integral display of said television signal processing system.

2. The method of claim 1, wherein processing the television signal to extract auxiliary data from the auxiliary data component includes extracting auxiliary data comprising closed caption data.

3. The method of claim 1, wherein:
    receiving a television signal having a video component and an auxiliary data component includes receiving a television signal having a video component comprising a plurality of frames with each frame having first and second fields;
    processing the television signal to obtain a main video signal and an auxiliary video signal from the video component includes obtaining a main video signal having a plurality of frames with each frame having first and second fields, and obtaining an auxiliary video signal having a plurality of frames with each frame having first and second fields; and
    wherein synchronizing the extracted auxiliary data with the auxiliary video signal utilizing the main video signal includes determining if field inversion exists between the frames of the auxiliary video signal and the frames of the main video signal.

4. The method of claim 3, wherein synchronizing the extracted auxiliary data with the auxiliary video signal utilizing the main video signal includes inverting fields of the frames of the auxiliary video signal if it is determined that field inversion exists between the main video signal and the auxiliary video signal.

5. The method of claim 4, wherein synchronizing the extracted auxiliary data with the auxiliary video signal utilizing the main video signal includes inversing an output field of a frame of the auxiliary video signal if a deinterlacer is used.

6. The method of claim 1, wherein synchronizing the extracted auxiliary data with the auxiliary video signal utilizing the main video signal includes utilizing a vertical interrupt signal derived from a vertical blanking interval of the main video signal.

7. A television signal processing system comprising:
    a signal processor;
    a television signal tuner coupled to said signal processor;
    auxiliary data processing circuitry coupled to said signal processor;
    at least one of a primary video signal output or integral display;
    an auxiliary video signal output coupled to said signal processor; and
    memory coupled to the signal processor and containing program instructions which, when executed by the signal processor, causes the television signal processing system to:
    receive a television signal shaving a video component and an auxiliary data component via said tuner;
    obtain a main video signal and an auxiliary video signal from the video component of the received television signal;
    extract auxiliary data from the auxiliary data component of the received television signal via said auxiliary data processing circuitry;
    detect a field inversion between said main video signal and said auxiliary video signal;

synchronize the extracted auxiliary data with the auxiliary video signal in response to said detection of said field inversion; and output the synchronized auxiliary data with the auxiliary video signal to said auxiliary output while outputting said main video signal to said at least one of a primary video signal output or integral display of said television signal processing system.

8. The television signal processing system of claim 7, wherein said memory has further program instructions which, when executed by said signal processor, causes the television signal processing system to process the received television signal to extract auxiliary data from the auxiliary data component via said auxiliary data that comprises closed caption data.

9. The television signal processing system of claim 7, wherein said memory has further program instructions which, when executed by said signal processor, causes the television signal processing system to:

receive, a said tuner, a television signal having a video component and an auxiliary data component wherein the video component has a plurality of frames with each frame having first and second fields;

process, via the signal processor, the television signal to obtain a main video signal and an auxiliary video signal from the video component wherein the main video signal has a plurality of frames with each frame having first and second fields, and the auxiliary video signal has a plurality of frames with each frame having first and second fields; and synchronize the extracted auxiliary data with the auxiliary video signal utilizing the main video signal including determining if field inversion exists between the frames of the auxiliary video signal and the frames of the main video signal.

10. The television signal processing system of claim 9, wherein said memory has further program instructions which, when executed by said television signal processing circuitry, causes the television signal processing system to synchronize the extracted auxiliary data with the auxiliary video signal utilizing the main video signal including inverting fields of the frames of the auxiliary video signal if it is determined that field inversion exists between the main video signal and the auxiliary video signal.

11. The television signal processing system of claim 10, wherein said memory has further program instructions which, when executed by said television signal processing circuitry, causes the television signal processing system to synchronize the extracted auxiliary data with the auxiliary video signal utilizing the main video signal including inversing an output field of a frame of the auxiliary video signal if a deinterlacer is used.

12. The television signal processing system of claim 7, wherein said memory has further program instructions which, when executed by said television signal processing circuitry, causes the television signal processing system to synchronize the extracted auxiliary data with the auxiliary video signal utilizing the main video signal including utilizing a vertical interrupt signal derived from a vertical blanking interval of the main video signal.

13. A television signal receiver comprising:
means for processing a television signal;
means, coupled to said means for processing a television signal, for tuning a television signal;
means, coupled to said means for processing a television signal, for processing auxiliary data;
at least one of primary video signal output means or integral display means;
auxiliary video signal output means, coupled to said means for processing a television signal; and
memory means coupled to said means for processing a television signal and containing program instructions which, when executed by said means for processing a television signal, causes the television signal receiver to:
receive a television signal having a video component and an auxiliary data component via said tuner;
obtain a main video signal and an auxiliary video signal from the video component of the received television signal;
extract auxiliary data from the auxiliary data component of the received television signal via said auxiliary data processing circuitry;
detect a field inversion between said main video signal and said auxiliary video signal;
synchronize the extracted auxiliary data with the auxiliary video signal in response to said detection of said field inversion; and
output the synchronized auxiliary data with the auxiliary video signal to said auxiliary output while outputting said main video signal to said at least one of primary video signal output means or integral display means of said television signal receiver.

14. The television signal receiver of claim 13, wherein said memory means has further program instructions which, when executed by said means for processing a television signal, causes the television signal receiver to process the received television signal to extract auxiliary data from the auxiliary data component via said auxiliary data that comprises closed caption data.

15. The television signal receiver of claim 13, wherein said memory means has further program instructions which, when executed by said means for processing a television signal, causes the television signal receiver to:

receive, via said means for tuning, a television signal having a video component and an auxiliary data component wherein the video component has a plurality of frames with each frame having first and second fields;

process, via said means for processing a television signal, the television signal to obtain a main video signal and an auxiliary video signal from the video component wherein the main video signal has a plurality of frames with each frame having first and second fields, and the auxiliary video signal has a plurality of frames with each frame having first and second fields; and synchronize the extracted auxiliary data with the auxiliary video signal utilizing the main video signal including determining if field inversion exists between the frames of the auxiliary video signal and the frames of the main video signal.

16. The television signal receiver of claim 15, wherein said memory means 3 has further program instructions which, when executed by said means for processing a television signal, causes the television signal receiver to synchronize the extracted auxiliary data with the auxiliary video signal utilizing the main video signal including inverting fields of the frames of the auxiliary video signal if it is determined that field inversion exists between the main video signal and the auxiliary video signal.

17. The television signal receiver of claim 16, wherein said memory means has further program instructions which, when executed by said means for processing a television signal, causes the television signal receiver to synchronize the extracted auxiliary data with the auxiliary video signal utilizing the main video signal including inversing an output field of a frame of the auxiliary video signal if a deinterlacer is used.

18. The television signal receiver of claim 13, wherein said memory means has further program instructions which, when executed by said means for processing a television signal, causes the television signal receiver to synchronize the extracted auxiliary data with the auxiliary video signal utilizing the main video signal including utilizing a vertical interrupt signal derived from a vertical blanking interval of the main video signal.

* * * * *

UNITED STATES PATENT AND TRADEMARK OFFICE
CERTIFICATE OF CORRECTION

| | | |
|---|---|---|
| PATENT NO. | : 7,646,431 B2 | Page 1 of 1 |
| APPLICATION NO. | : 10/512366 | |
| DATED | : January 12, 2010 | |
| INVENTOR(S) | : Janghwan Lee | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this

Sixteenth Day of November, 2010

David J. Kappos
*Director of the United States Patent and Trademark Office*